(No Model.) 2 Sheets—Sheet 1.
J. CASEY & S. A. MORGAN.
COTTON CHOPPER.
No. 434,764. Patented Aug. 19, 1890.
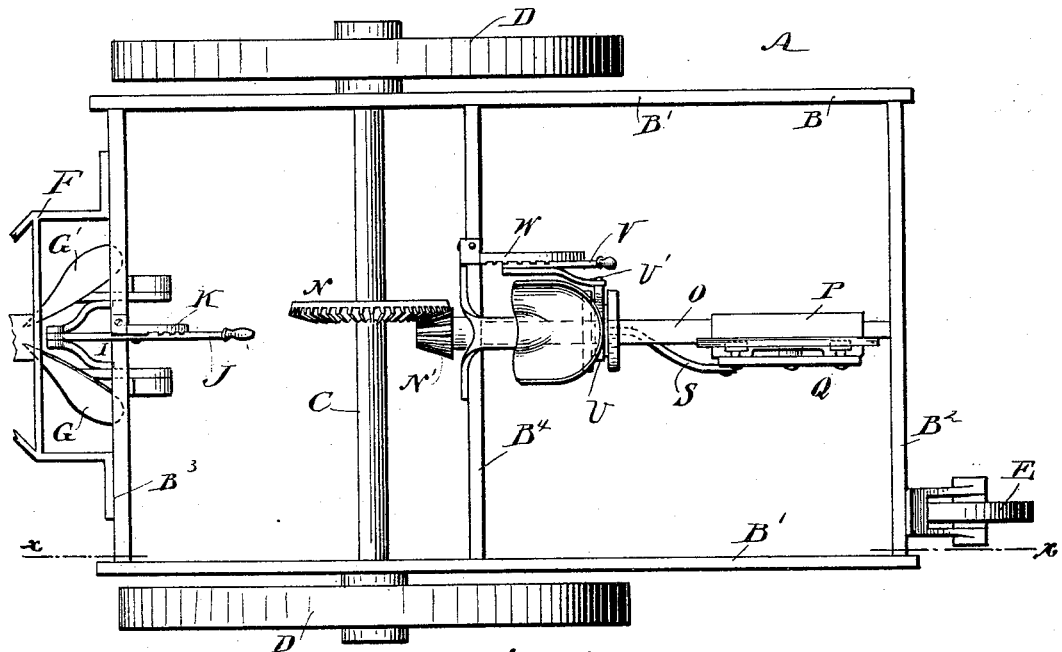
Fig. 1.
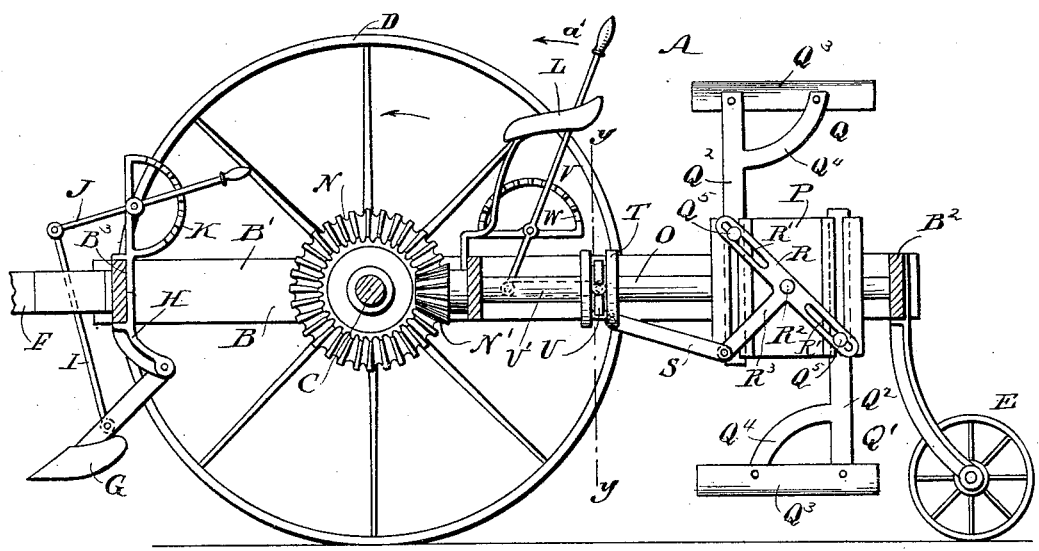
Fig. 2.
Fig. 4.
WITNESSES:
INVENTOR
J. Casey
S. A. Morgan
BY Munn & Co.
ATTORNEY (No Model.) 2 Sheets—Sheet 2.
J. CASEY & S. A. MORGAN.
COTTON CHOPPER.
No. 434,764. Patented Aug. 19, 1890.
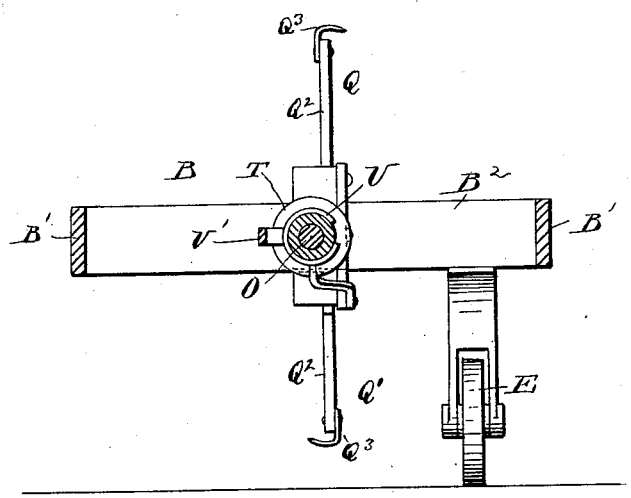
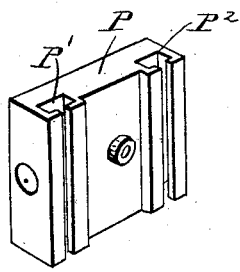
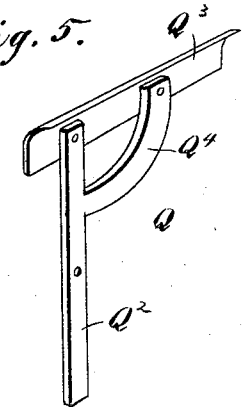
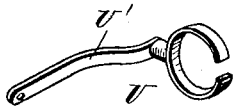
WITNESSES:
INVENTOR
BY
ATTORNEY
THE NORRIS PETERS CO., PHOTO-LITHO., WASHINGTON, D. C.

UNITED STATES PATENT OFFICE.

JAMES CASEY AND STEPHEN A. MORGAN, OF LEHIGH, INDIAN TERRITORY.

COTTON-CHOPPER.

SPECIFICATION forming part of Letters Patent No. 434,764, dated August 19, 1890.

Application filed April 5, 1889. Serial No. 306,063. (No model.)

*To all whom it may concern:*

Be it known that we, JAMES CASEY and STEPHEN A. MORGAN, both of Lehigh, in the Choctaw Nation, Indian Territory, have invented a new and Improved Cotton-Chopper, of which the following is a full, clear, and exact description.

The invention relates to agricultural machines; and its object is to provide a new and improved chopper, which is simple and durable in construction, very effective in operation, and specially designed for chopping new cotton to a stand in the row.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a sectional side elevation of the same on the line $x\ x$ of Fig. 1. Fig. 3 is a transverse section of the same on the line $y\ y$ of Fig. 2. Fig. 4 is a perspective view of one of the knife-blades. Fig. 5 is a like view of one of the knives. Fig. 6 is a perspective view of the block, and Fig. 7 is a perspective view of the forked arm.

The improved chopper A is provided with a rectangular frame B, supported by its side beams B' on an axle C, carrying on its outer ends the drive-wheels D D. On the rear end beam $B^2$ of the frame B is secured a small guide-wheel E, which supports the rear end of the frame B. On the front end beam $B^3$ of the frame B is secured a tongue F, to which the animals are hitched for drawing the machine forward over the cotton-field.

Below the middle of the front beam $B^3$ of the frame B, are arranged the two plows G and G', which serve to scrape or bar off the row of cotton. The plows G and G' are pivotally connected to the lower end of a bracket H, secured to the beam $B^3$, and the said plows are pivotally connected by links I with a lever J, fulcrumed on the upper end of the bracket H, and adapted to be locked in place on a notched segment K, formed on the said bracket H. The handle end of the lever J extends rearward, so as to be within convenient reach of the operator seated on the seat L, secured in the middle of the transverse beam $B^4$ of the frame B. The lever J can be raised or lowered so as to cause the plows G and G' to engage more or less of the ground of the row of cotton-stalks.

On the shaft C is secured a bevel gear-wheel N, which meshes into a pinion N', fastened on a shaft O, extending longitudinally in the middle of the frame B and mounted to turn in suitable bearings formed on the beams $B^4$ and $B^2$.

Near the rear end of the shaft O is secured a block P, carrying the knives Q and Q', extending in opposite directions from the said block P. Each of the knives Q and Q' is provided with an arm $Q^2$, fitting into guide-ways P' and $P^2$, respectively, formed on the block P. On the outer end of each arm $Q^2$ is secured a longitudinally-extending knife-blade $Q^3$, which is slightly curved at its cutting-edge, as is plainly shown in Figs. 4 and 5.

A branch arm $Q^4$ extends from each arm $Q^2$ and carries one end of the knife-blade $Q^3$, so that the latter is securely held in place on the arm $Q^2$. On each of the latter is secured a pin $Q^5$, projecting through the respective guideway P' or $P^2$ and engaging a slot R', formed in a lever R, pivoted by its middle in the middle of the block P. From the middle of the lever R extends at right angles to the same an arm $R^3$, pivotally connected at its outer end by a link S with a collar T, mounted to slide on and turning with the shaft O, carrying the knife-block P. The collar T is provided with an annular groove engaged by a fork U, provided with an arm U', pivotally connected with the lower end of a lever V, adapted to be locked in place on a notched segment W, secured on the transverse beam $B^4$, and also forming at its base the fulcrum for the lever V.

The operation is as follows: The cotton-chopper A is drawn over the field so that the row of cotton-stalks is between the wheels D D. The forward motion of the machine causes the wheels D to rotate so that the shaft C is rotated in its bearings, and by the bevel gear-wheel N engaging the pinion N' imparts a rotary motion to the longitudinally-extending shaft O, and as the latter rotates the knives Q and Q' turn with the shaft, and their cutting-edges cut the stalks near the top of the row. It is to be understood that the knives Q and Q' rotate transversely on the row of cotton-stalks and are moved backward and forward by the motion of the machine. The operator can cut the cotton-stalks nearer to or farther from the ground by adjusting the lever V on the segment W.

When the operator moves the said lever V in the direction of the arrow $a'$, the collar T is caused to slide rearward on the shaft O, so that the lever R is oscillated, and the pins $Q^5$, connected with the said lever, are drawn inward, whereby the knife-arms $Q^2$ are moved toward each other, and consequently draw the knife-blades $Q^3$ nearer to the shaft O, so that the cotton-stalks are cut higher up. The movement of the lever V in the inverse direction of the arrow $a'$ causes the knives to slide outward, so that the cotton-stalks are cut nearer to the top of the row. Thus it will be seen that a very simple and convenient device is provided for cutting the cotton-stalks at any desired distance from the ground.

Having thus fully described our invention, we claim as new and desire to secure by Letters Patent—

1. In a cotton-chopper, the combination, with a rotary shaft, of a block secured on the said shaft, knife-arms held to slide transversely on said block, knife-blades secured on the said knife-arms, an operating-lever, and connections between the lever and knife-arms for moving the said knife-arms on the said block, substantially as described.

2. In a cotton-chopper, the combination, with a rotary shaft, of a block secured on the said shaft and provided with guideways, knife-arms held to slide in the said guideways, a knife-blade extending longitudinally and secured on each of the said knife-arms, a slotted lever fulcrumed on the said block and pivotally connected with the said knife-arms, and a collar held to slide on and turning with the said shaft and connected with the said lever, substantially as shown and described.

3. In a cotton-chopper, the combination, with a rotary shaft, of a block secured on the said shaft and provided with guideways, knife-arms held to slide in the said guideways, a knife-blade extending longitudinally and secured on each of the said knife-arms, a slotted lever fulcrumed on the said block and pivotally connected with the said knife-arms, a collar held to slide on and turning with the said shaft and connected with the said lever, and a hand-lever connected with the said collar and adapted to be locked in any desired position, substantially as shown and described.

4. In a cotton-chopper, the combination, with a shaft extending longitudinally and mounted to rotate, of a block secured on the said shaft and provided with transversely-extending guideways, knife-arms held to slide in the said guideways, knife-blades secured to the outer ends of the said knife-arms, and a slotted lever pivoted in the middle of the said block and pivotally connected with the said knife-arms, substantially as shown and described.

5. In a cotton-chopper, the combination, with a rotating shaft carrying a fixed block, of knives arranged to slide in said block and rotating therewith on the shaft, with an operating-lever, and connections between the knives and lever for operating the knives from the lever, substantially as described.

JAMES CASEY.
STEPHEN A. MORGAN.

Witnesses:
H. Y. McBRIDE,
CHAS. HAYES.